July 31, 1923.
J. C. PARKER
STEAM GENERATOR FITTING
Filed July 29, 1922
1,463,658
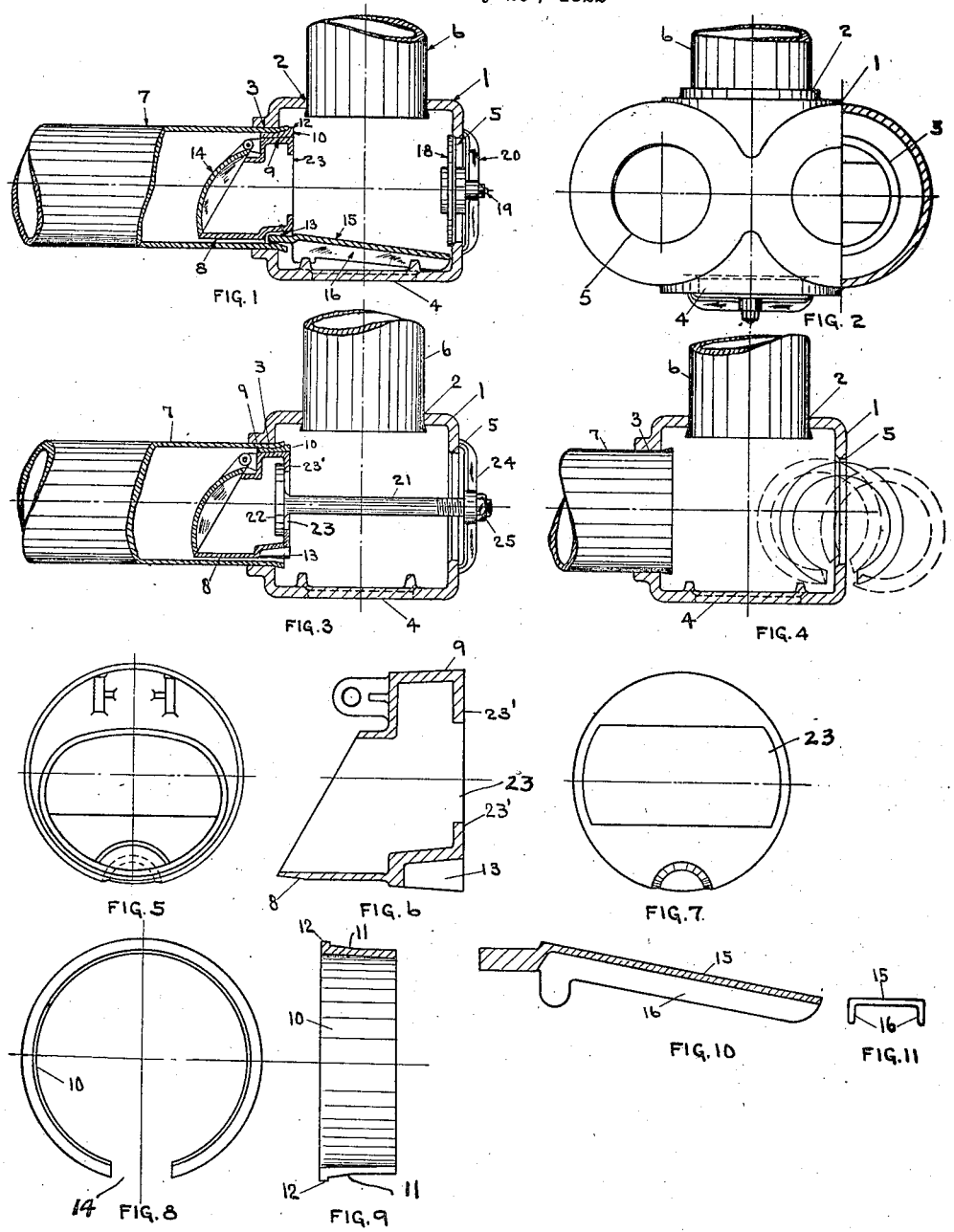
INVENTOR
John C. Parker
BY
Butler & Denny
ATTORNEYS Patented July 31, 1923.

1,463,658

UNITED STATES PATENT OFFICE.

JOHN C. PARKER, OF PHILADELPHIA, PENNSYLVANIA.

STEAM-GENERATOR FITTING.

Application filed July 29, 1922. Serial No. 578,307.

*To all whom it may concern:*

Be it known that I, JOHN C. PARKER, a citizen of the United States, residing in the city of Philadelphia, county of Philadelphia, and State of Pennsylvania, have invented certain Improvements in Steam-Generator Fittings, of which the following is a specification.

This invention relates especially to fittings for check valves used in water tubes of steam generators, and it is designed primarily to provide improved means for inserting, seating, and removing such check valves through junction boxes for connecting tubes in which such valves are used, to the end that the valves may be fixed in correct position in said tubes engaged in special junction boxes and be withdrawn from said tubes through said boxes.

My invention comprises, in a preferred form thereof, the combination with a tube and a junction box having a circular seat for said tube together with a circular handhole of smaller diameter than said seat in line therewith, of a check valve adapted to pass through said handhole into said tube, an open or split ring or ferrule adapted to pass through said handhole into its position between said tube and valve to fix said parts together, a strut adapted for passing through said handhole to engage said valve and prevent its withdrawal from said seat in said ferrule or ring within said tube, and a T-bolt adapted to connect said valve (adapted therefor) through said handhole with a spider or bearing to effect the withdrawal of said valve.

In the accompanying drawings, Fig. 1 is a broken part sectional view of a junction box connecting tubes, with a check valve fixed in one of said tubes in accordance with my invention; Fig. 2 is a part sectional elevation of parts illustrated in Fig. 1; Fig. 3 is a view similar to Fig. 1 with the handhole cover and valve strut removed, the valve being connected through a T-bolt with a spider to effect the withdrawal of such valve; Fig. 4 is a sectional view of a box having tube ends engaged therein with an illustration of positions occupied by the ferrule or open ring in entering the box; Fig. 5 is an enlarged rear end view of the detached valve body; Fig. 6 is an axial sectional view of said body; Fig. 7 is an enlarged front end view of said body; Figs. 8 and 9 are end and sectional views respectively of the detached open ring or ferrule; and Figs. 10 and 11 are longitudinal section and end views respectively of the valve strut.

As illustrated in the drawings, the junction box 1 is provided with tube holes 2 and 3 and with handholes 4 and 5 in line with the respective tube holes and of smaller diameter than the same, the holes 2 and 3 having the respective tubes 6 and 7 fixed therein.

The tubes 7 are provided with check valves to prevent reverse flow therethrough to the box 1, such valves comprising respectively a body 8 having a section 9 with a slightly conical or tapered exterior which is seated in a similarly tapered interior of an open or split ring or ferrule 10 disposed within the corresponding tubes 7, the part 10 having a peripheral conical surface 11 and flange 12 on the rear end thereof for engaging the expanded end of the tube. The valve body 8 has a recess or notch 13 in the bottom part of the section 9 with which the opening 14 of the part 10 registers. A strut 15 having the side flanges 16 for supporting it within the box 1, has its forward end disposed in the notch 13 while its rear end is engaged with the corresponding vertical wall of the box, to hold the valve body 8 in position within the ring 10 and the tube 7. A circular handhole cover 18, placed in the box through an opening 2 or 3 prior to the insertion of the tubes therein, is engaged on its seat concentric with the corresponding handhole 5 by the bolt 19 and the spider 20 which bears against the outer surface of the box.

This construction is readily assembled and the parts securely fixed in their positions by placing the handhole covers in the boxes, then placing the tubes in their seats in the boxes where they are expanded, then inserting the open rings or ferrules through the box handhole of smaller diameter by moving such rings through the positions shown in Fig. 4, then inserting the valves through the handholes followed by pressing such valves and the open rings thereon into the tube ends where they are fixed by the wedging action of the conical surfaces, then inserting the struts or valve holders through the handholes and placing them in the position illustrated in Fig. 1, and then engaging the covers upon the handholes by means of the bolts and spiders.

It will be understood that this construction provides readily assembled means whereby the valves can be held in the desired positions, so that they will be neither too far in or too far out of the corresponding tube ends, in a construction in which the desired relatively small circular handholes and caps are used.

The valves are withdrawn from their seats by means of a T-bolt 21 which is passed through a handhole 5 and its head 22 inserted through the elongated opening 23 in the valve body, the head being turned so that it will engage the valve flanges 23'. A spider 24 is engaged on the bolt, against the box 1, and a nut 25 on the bolt acts against the spider to draw the bolt therethrough and withdraw the valve.

Having described my invention, I claim:—

1. In combination with a junction box and a tube set therein, a valve having a body disposed in said tube and a ring segment engaged in said tube and on said body so as to fix the latter in place.

2. In combination with a junction box and a tube set therein, said box having a handhole of smaller diameter than the external diameter of said tube, a valve having a body adapted to pass through said handhole and into said tube, and a ring segment adapted to pass through said handhole for engaging said valve body in said tube.

3. In combination with a junction box having a handhole and a tube of larger cross-section than said handhole, said tube set in said box, a check valve having a body adapted to pass through said handhole into said tube, a ring segment adapted to pass through said handhole for engaging said body in said tube, and a strut for engaging said body in position in said tube.

4. In combination with a junction box and a tube set therein, a check valve having a body disposed in said tube, said body having a peripheral recess, a ring segment disposed in said tube and on said body with the opening thereof in registration with said recess, and a strut in said box having an end thereof engaged in said recess.

5. In combination with a junction box and a tube set therein, a check valve having a tapered body disposed in said tube, and a ring segment having a tapered internal surface engaged on said body, an external surface engaged in said tube and a flange adapted to engage said tube.

In testimony whereof I have hereunto set my name this 28th day of July, 1922.

JOHN C. PARKER.